US010949461B2

(12) United States Patent
Goldberg et al.

(10) Patent No.: US 10,949,461 B2
(45) Date of Patent: Mar. 16, 2021

(54) COMPOSABLE TEMPLATES FOR MANAGING DISTURBING IMAGE AND SOUNDS

(71) Applicant: INTERNATIONAL BUSINESS MACHINES CORPORATION, Armonk, NY (US)

(72) Inventors: Itzhack Goldberg, Hadera (IL); Clifford A. Pickover, Yorktown Heights, NY (US); Maja Vukovic, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/131,581

(22) Filed: Apr. 18, 2016

(65) Prior Publication Data
US 2017/0300512 A1 Oct. 19, 2017

(51) Int. Cl.
G06F 16/58 (2019.01)
G06K 9/00 (2006.01)

(52) U.S. Cl.
CPC ........... *G06F 16/5866* (2019.01); *G06K 9/00* (2013.01); *G06K 9/00315* (2013.01)

(58) Field of Classification Search
CPC ....... H04N 21/23418; H04N 21/25891; H04N 21/2668; H04N 21/4181; H04N 21/4182;
(Continued)

(56) References Cited

U.S. PATENT DOCUMENTS 5,828,402 A * 10/1998 Collings ............ H04N 5/44543
348/460
8,224,106 B2 7/2012 Bing et al.
(Continued)

FOREIGN PATENT DOCUMENTS

FR 2179141 10/1995
WO 2011045422 4/2011
WO 2015017868 2/2015

OTHER PUBLICATIONS

London, Bianca, Daily Mail, "Photobombers ruining your snaps? There's an app for that! Spruced up lets you professionally erase people from your pictures", Jul. 2014, pp. 1-37.
(Continued)

*Primary Examiner* — Oschta I Montoya
(74) *Attorney, Agent, or Firm* — Tutunjian & Bitetto, P.C.; Rahan Uddin

(57) ABSTRACT

A method and system are provided. The method includes analyzing, by a hardware processor, one or more images to determine cognitive characteristics related to the one or more images and to a user. The method further includes forming, by the hardware processor, a composable template relating to the cognitive characteristics. The method also includes performing, by the hardware processor or another hardware processor, an amelioration action with respect to a displaying on a display device of at least one image from the one or more images, based on the composable template. The amelioration action is selected from a set of amelioration actions that include transmitting the at least one image to the disturbing image repository.

20 Claims, 9 Drawing Sheets

(58) Field of Classification Search
CPC ......... H04N 21/4318; H04N 21/44204; H04N 21/44218; H04N 21/4542; H04N 21/4545; H04N 21/454; H04N 21/45452; H04N 21/45455; H04N 21/45457; H04N 21/4662; H04N 21/4663; H04N 21/4665; H04N 21/4667; H04N 21/4668; H04N 21/4755; H04N 21/4756; H04N 21/6582; H04N 21/8133; H04N 21/8547; H04N 21/4532; H04N 21/4627; G06K 9/6255; G06K 9/00315; G06K 9/00218; G06F 17/30268
USPC .............................................. 725/28, 29, 46
See application file for complete search history.

(56) References Cited

U.S. PATENT DOCUMENTS

| | | |
|---|---|---|
| 8,856,030 B2 | 10/2014 | Russek |
| 2002/0147782 A1* | 10/2002 | Dimitrova ............... H04N 7/163 709/207 |
| 2003/0195863 A1* | 10/2003 | Marsh ................... G11B 27/322 |
| 2004/0210633 A1* | 10/2004 | Brown ................ H04L 12/1845 709/203 |
| 2005/0028191 A1* | 2/2005 | Sullivan ............... H04N 5/4401 725/28 |
| 2006/0026655 A1* | 2/2006 | Perez ..................... G06Q 30/02 725/91 |
| 2006/0095410 A1* | 5/2006 | Ostrover ................ H04N 7/163 |
| 2007/0250863 A1* | 10/2007 | Ferguson ............. H04H 20/106 725/46 |
| 2007/0297641 A1* | 12/2007 | Criddle .............. G06K 9/00375 382/100 |
| 2009/0034786 A1 | 2/2009 | Newell et al. |
| 2009/0041294 A1 | 2/2009 | Newell et al. |
| 2009/0175599 A1* | 7/2009 | Grim, III ............. G11B 27/034 386/248 |
| 2012/0093355 A1 | 4/2012 | Levien et al. |
| 2012/0233633 A1 | 9/2012 | Nishikawa |
| 2013/0254795 A1* | 9/2013 | Botta ................. H04N 21/4751 725/28 |
| 2001/4004954 | 2/2014 | Wang et al. |
| 2014/0270571 A1 | 9/2014 | Dwan et al. |
| 2014/0366049 A1* | 12/2014 | Lehtiniemi ...... H04N 21/44218 725/12 |
| 2015/0172242 A1 | 6/2015 | Goncalves |
| 2015/0178915 A1 | 6/2015 | Chatterjee et al. |
| 2015/0181291 A1* | 6/2015 | Wheatley ........... H04N 21/4542 725/10 |
| 2015/0242679 A1 | 8/2015 | Naveh |
| 2015/0332603 A1* | 11/2015 | Aravkin ................... G09B 5/04 434/238 |
| 2016/0066036 A1* | 3/2016 | Felt .................... H04N 21/4542 386/241 |
| 2017/0223414 A1* | 8/2017 | Debickes ........... H04N 21/4627 |

OTHER PUBLICATIONS

Spruced up!, Available at: http://www.spruced-up.com, 1 page, Last downloaded on Apr. 18, 2016.

* cited by examiner

COMPOSABLE TEMPLATES FOR MANAGING DISTURBING IMAGE AND SOUNDS

BACKGROUND

Technical Field

The present invention generally relates to image processing, and more particularly to composable templates for managing disturbing images and sounds.

Description of the Related Art

Images, photos, videos, and the like are frequently accessed at Web sites or viewed in broadcast media. Images may also reside in digital cameras. Also, many software programs exist to organize images in folders or albums, such as Adobe Photoshop® and Picasa®. These programs generally allow for sorting and ordering of different images, tagging the images, and viewing them in slideshows or printing them. Instagram® is an online mobile photo-sharing, video-sharing and social networking service that enables its users to take pictures and videos, and share them on a variety of social networking platforms, such as Facebook®, Twitter®, Tumblr®, and Flickr®. However, such images, photos, and videos often include disturbing content. Accordingly, there is a need for a way to manage the disturbing content for a user.

SUMMARY

According to an aspect of the present principles, a method is provided. The method includes analyzing, by a hardware processor, one or more images to determine cognitive characteristics related to the one or more images and to a user. The method further includes forming, by the hardware processor, a composable template relating to the cognitive characteristics. The method also includes performing, by the hardware processor or another hardware processor, an amelioration action with respect to a displaying on a display device of at least one image from the one or more images, based on the composable template. The amelioration action is selected from a set of amelioration actions that include transmitting the at least one image to the disturbing image repository.

According to another aspect of the present principles, a non-transitory computer readable storage medium is provided. The non-transitory computer readable storage medium includes a computer readable program for managing disturbing images. The computer readable program when executed on a computer causes the computer to perform a method. The method includes analyzing, by a hardware processor, one or more images to determine cognitive characteristics related to the one or more images and to a user. The method further includes forming, by the hardware processor, a composable template relating to the cognitive characteristics. The method also includes performing, by the hardware processor or another hardware processor, an amelioration action with respect to a displaying on a display device of at least one image from the one or more images, based on the composable template. The amelioration action is selected from a set of amelioration actions that include transmitting the at least one image to the disturbing image repository.

According to yet another aspect of the present principles, a system is provided. The system includes one or more hardware processors, configured to: analyze one or more images to determine cognitive characteristics related to the one or more images and to a user; form a composable template relating to cognitive characteristics; and perform an amelioration action with respect to a displaying on a display device of at least one image from the one or more images, based on the composable template. The amelioration action is selected from a set of amelioration actions that include transmitting the at least one image to the disturbing image repository.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present principles are directed to composable templates for managing disturbing images and sounds. It is to be appreciated that the present principles can be applied to any type of image, photo, or video, including those captured by a machine or created by a human (hand drawing, painting, and so forth). As such, the terms image, photo, and video are used interchangeably herein, as a video is simply two or more photos and/or images associated together to show motion.

Moreover, the present principles can be applied to sounds corresponding to one or more images (e.g., the sound in a video clip, and so forth). In this way, multiple media components having disturbing features can be managed in accordance with the present principles.

In an embodiment, the present principles perform an analysis of one or more images. A composable template is formed regarding cognitive characteristics related to the images and a user. Based on the analysis and the composable template, the system performs an amelioration action with respect to image display. For example, the composable template may specify how a user would want to be shielded. In a more particular example, the composable template can specify "blur out the face of my ex-husband" for situations when an image that includes the ex-husband's face appears on the Web or in an electronic photo album. The composable template can send (i.e., shuttle) the disturbing image to a Disturbing Image Repository (DIR) for later viewing when it is determined that the user feels emotionally stronger.

It is to be appreciated that the present principles are not directed to a system for image censorship, but rather for the disbursement of image content to repositories, for deferring the viewing to a time when the viewer may be more receptive to seeing the images. In an embodiment, if desired, pointers from the original image source (e.g., in a photo album or Web page) may be employed to redirect the user, when appropriate, to the repositories. In an embodiment, these repositories may optionally be first accessed or reviewed by a third party (e.g. a parent of a child, caregiver, and so forth).

Figure 1:
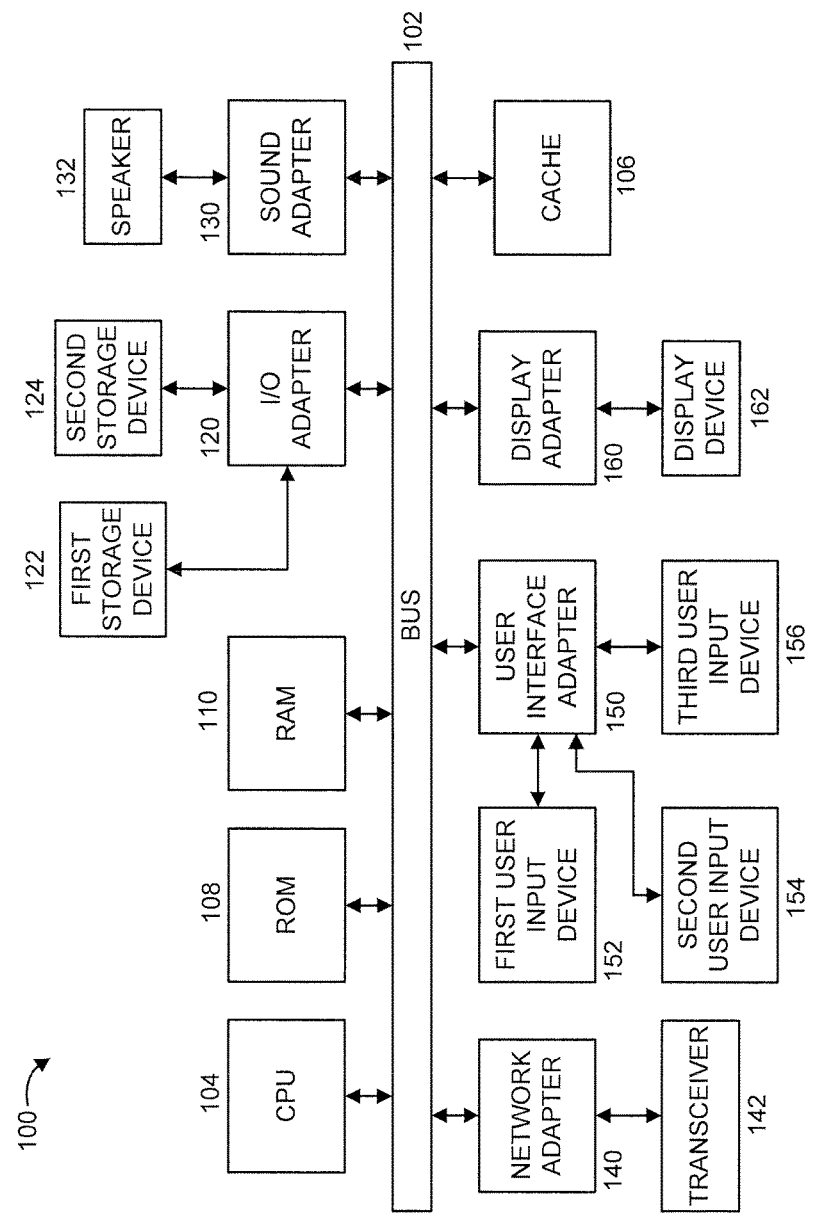
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
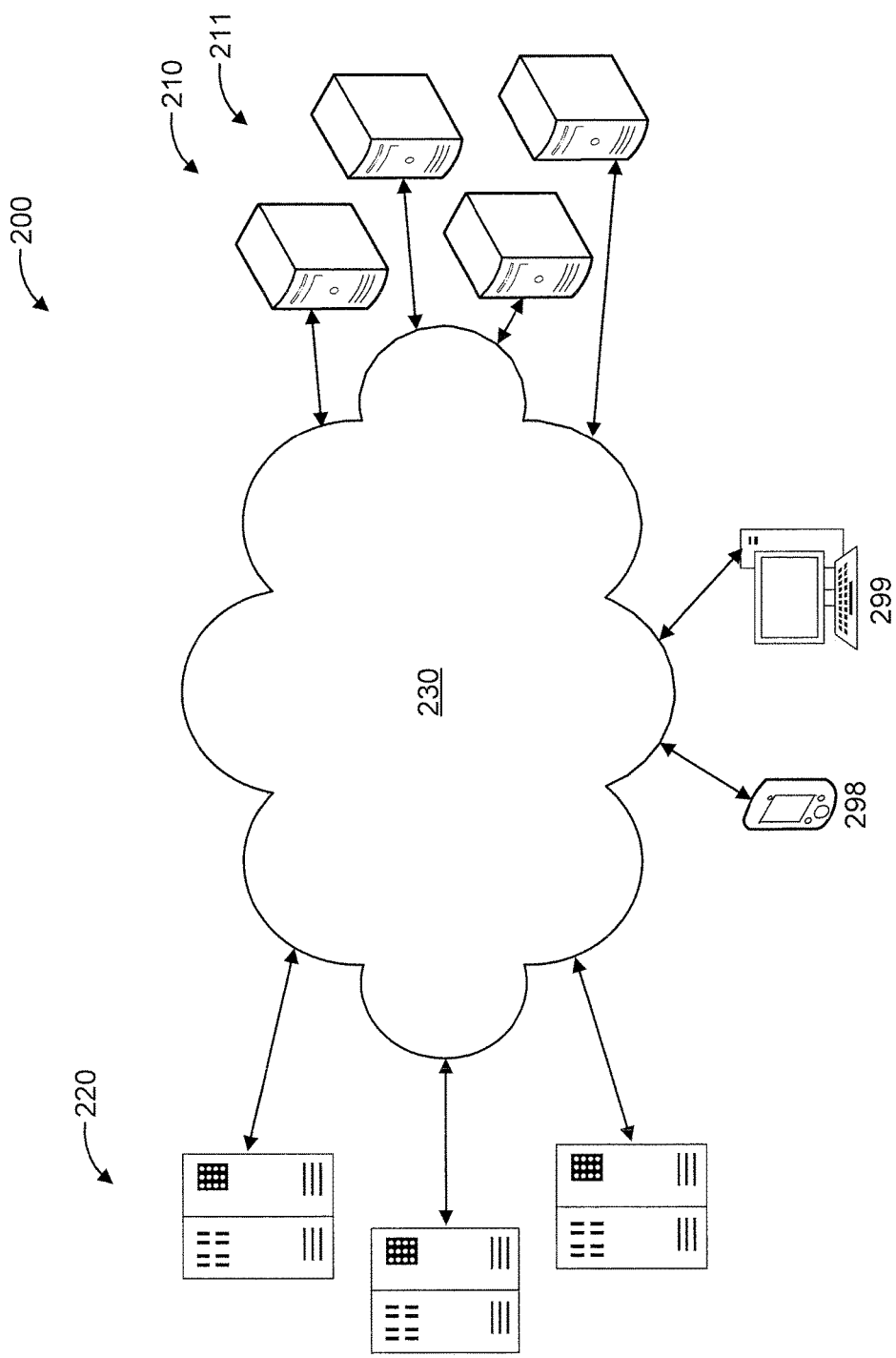
FIG. 2 shows an exemplary system for managing disturbing images and sounds, in accordance with an embodiment of the present principles.
Figure 3:
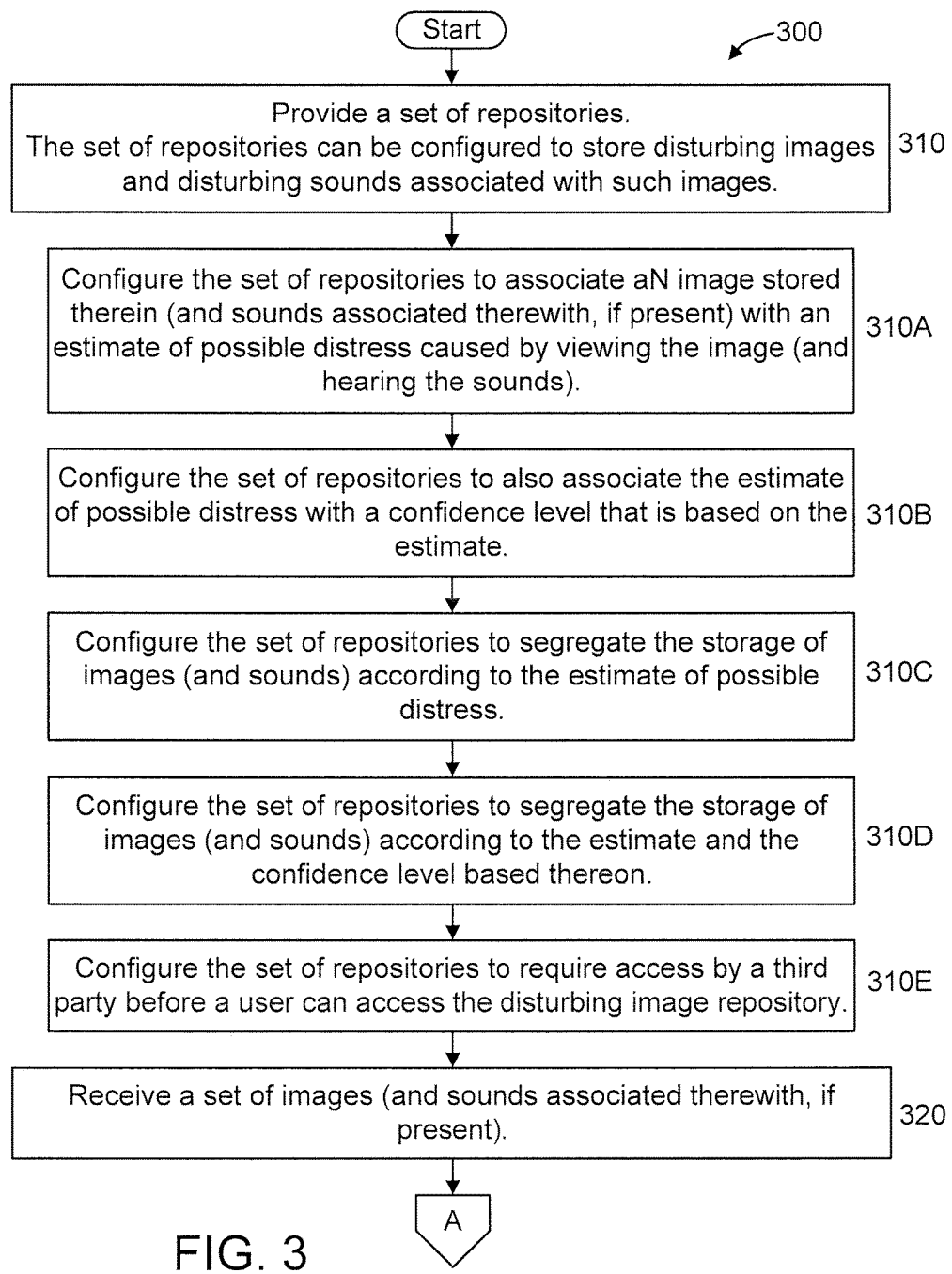
FIGS. 3-7 show an exemplary method for managing disturbing images and sounds, in accordance with an embodiment of the present principles.
Figure 4:
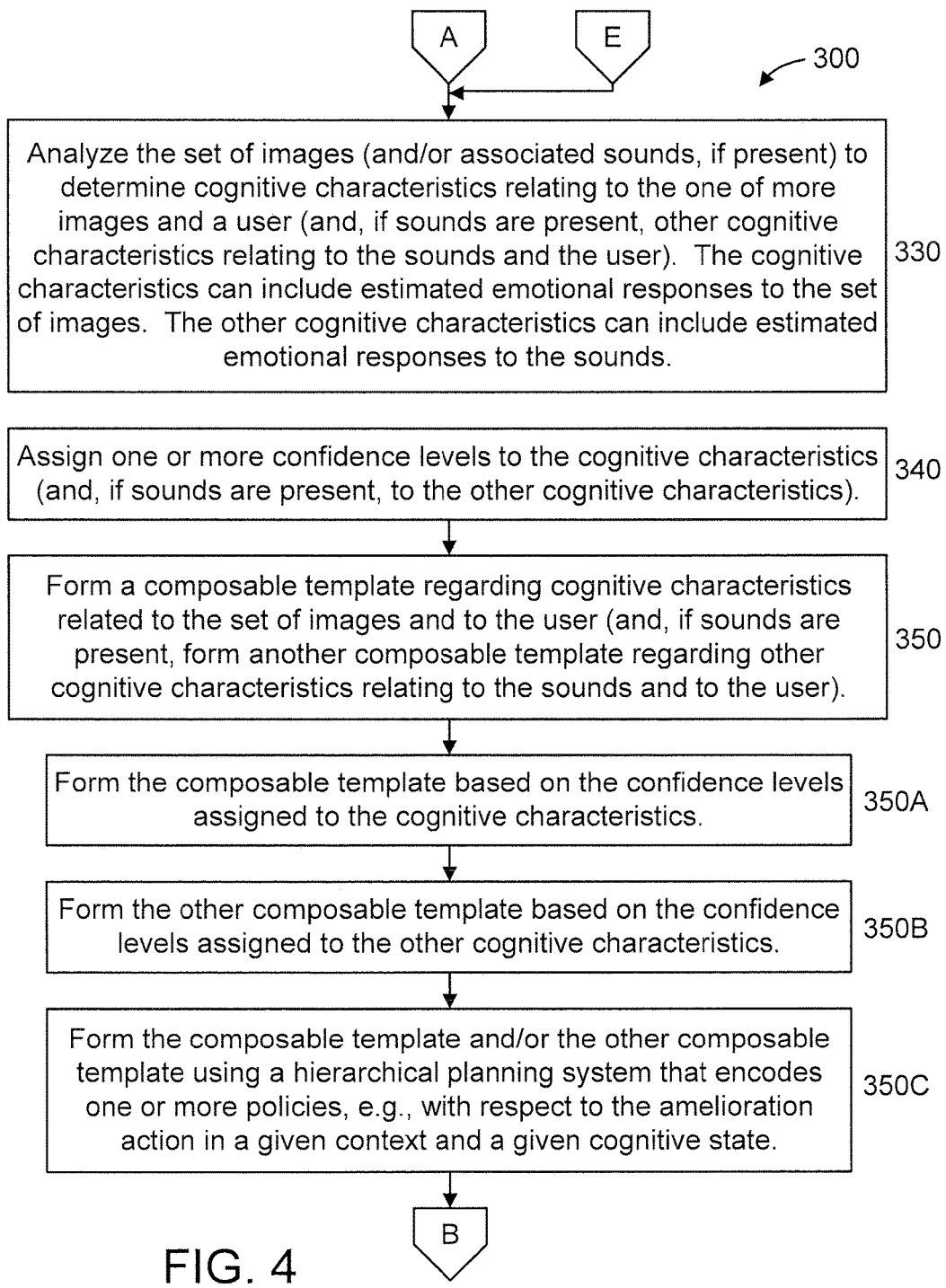
Figure 5:
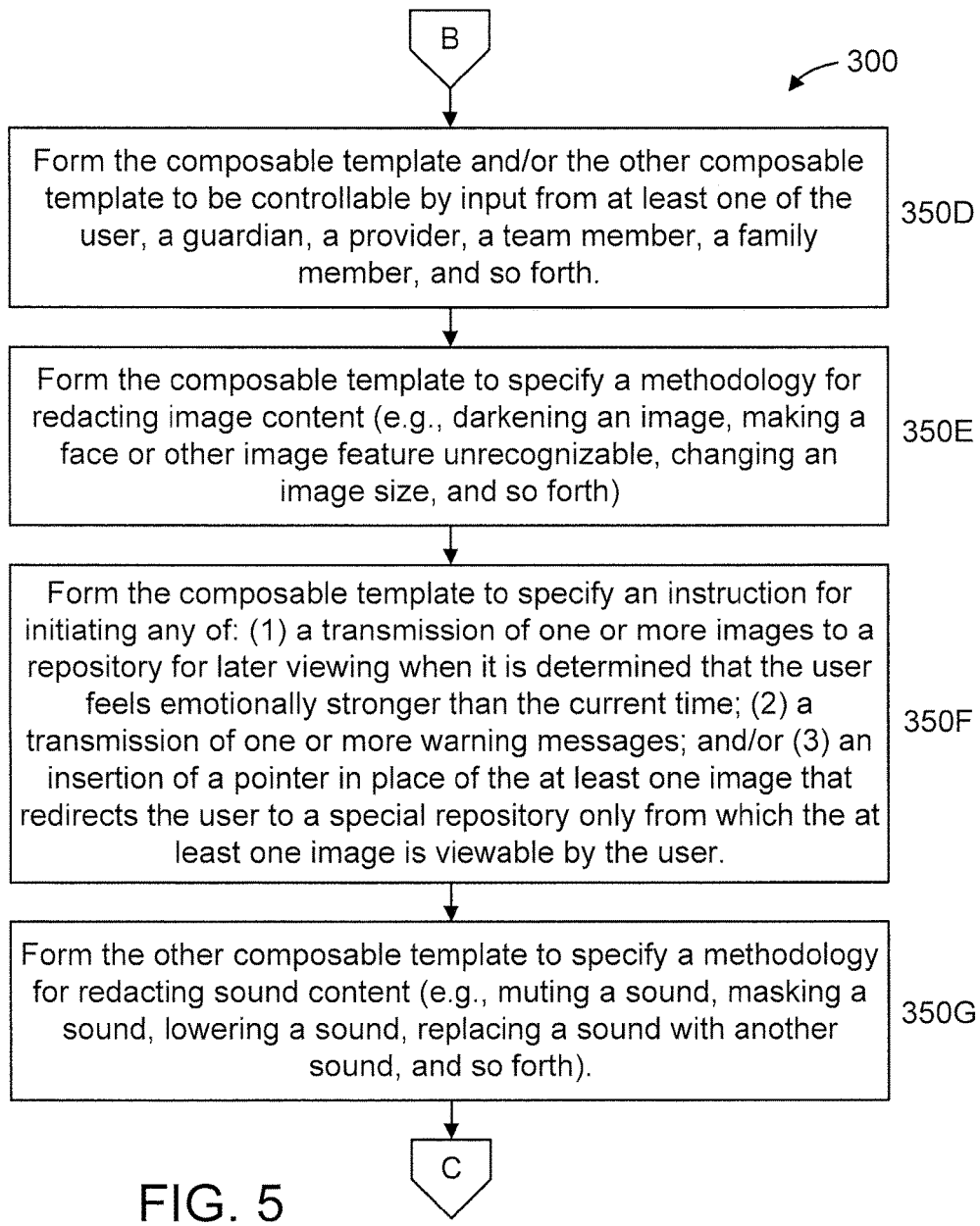
Figure 6:
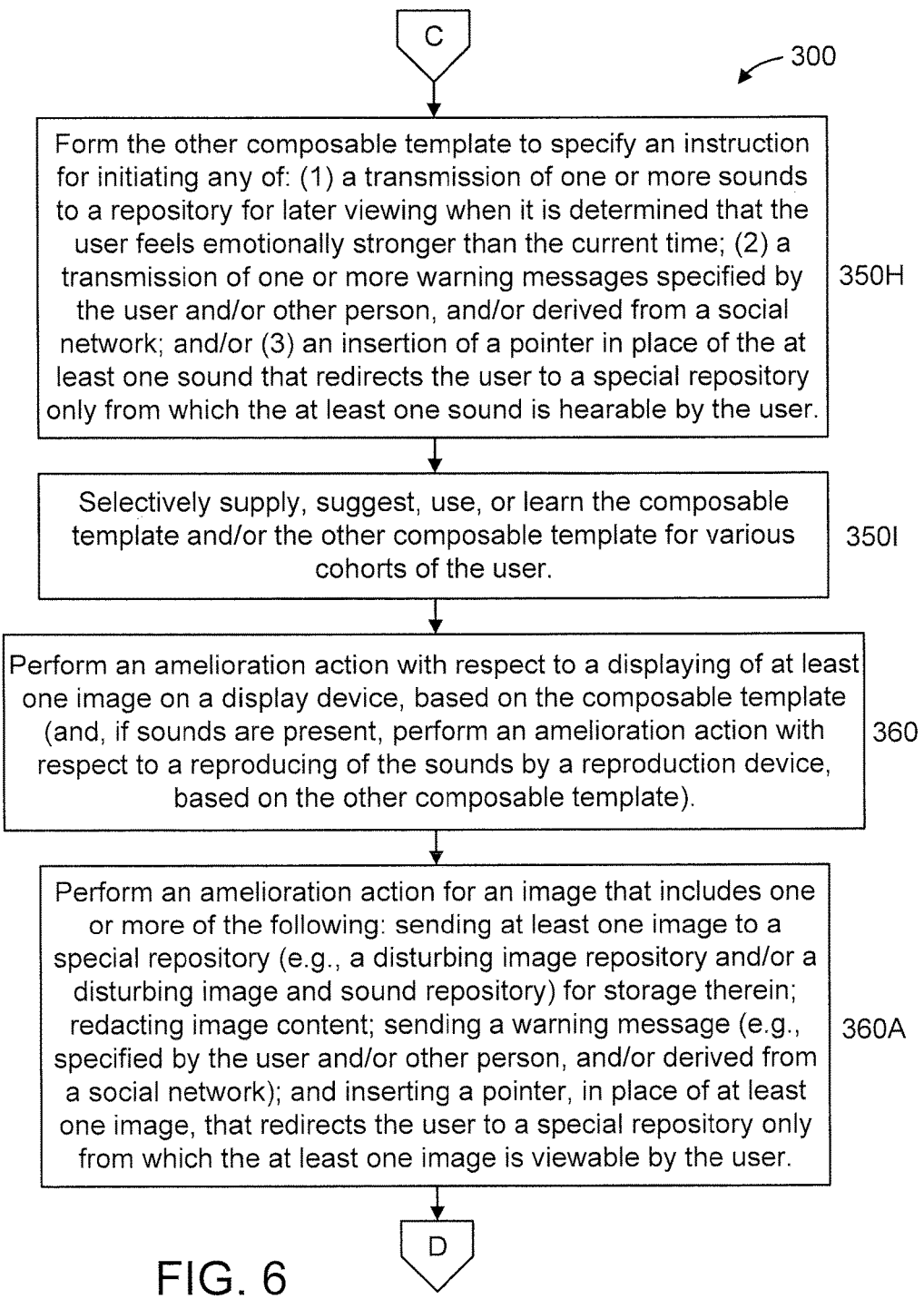
Figure 7:
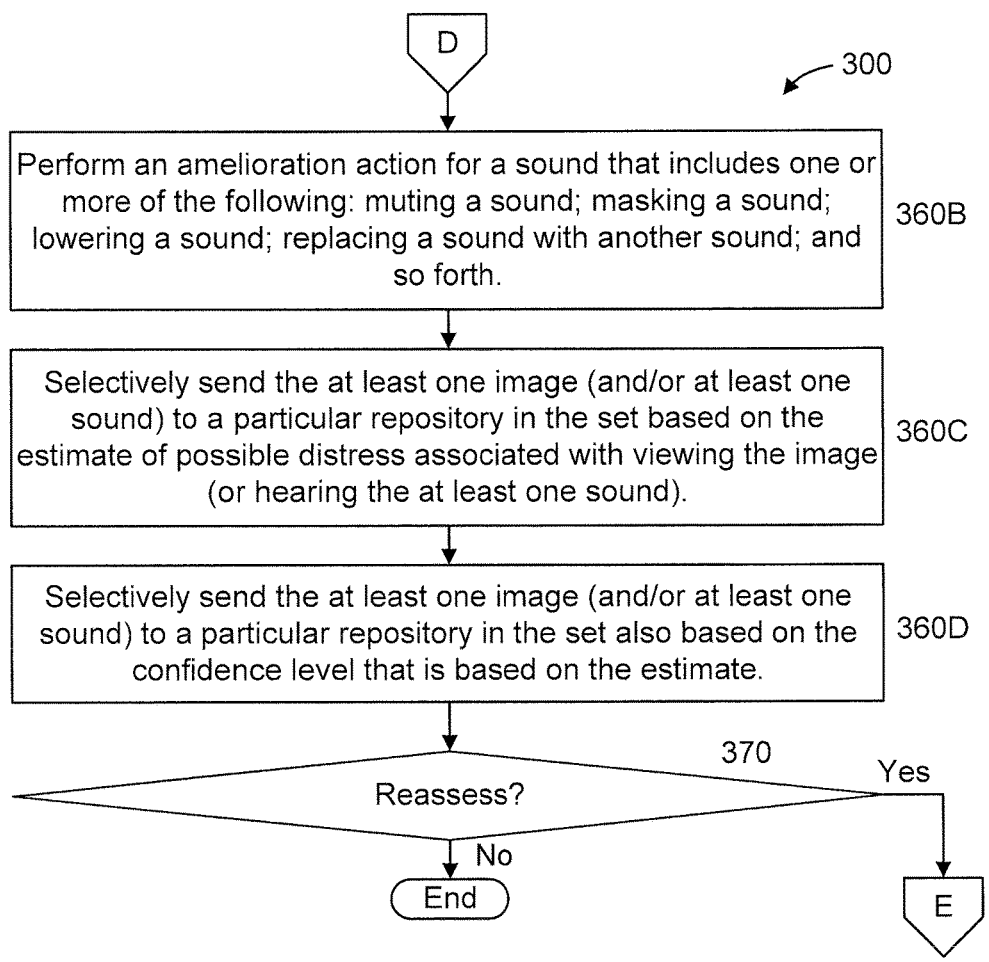

Moreover, it is to be appreciated that system 200 described below with respect to FIG. 2 is a system for implementing respective embodiments of the present principles. Part or all of processing system 100 may be implemented in one or more of the elements of system 200.

Further, it is to be appreciated that processing system 100 may perform at least part of the method described herein including, for example, at least part of method 300 of FIGS. 3-7. Similarly, part or all of system 200 may be used to perform at least part of method 300 of FIGS. 3-7.

FIG. 2 shows an exemplary system 200 for managing disturbing images and sounds, in accordance with an embodiment of the present principles.

The system 200 includes a set of servers (hereinafter "server" in short) 210 and a set of remote repositories 220. It is to be appreciated that the set of servers and the set of remote repositories can each include one or more members of that type, depending upon the implementation.

The server 210 and set of remote repositories communicate through one or more networks 230. The server 210 can receive images from any source including, but not limited to, the Internet, a user's device 298 (e.g., mobile phone, computer, tablet, media player, camera, camcorder, a photo providing service, and so forth), a cohort's device 299, and so forth. While one user's device 298 and one cohort's device 299 are shown, embodiments of the present principles can involve any number of image sources including more than one user device and/or more than one cohort device and/or more than one other image source.

The server 210 performs an analysis of a set of images and forms a composable template(s) regarding cognitive characteristics related to the set of images and a user. Based on the analysis and the composable template, the system performs an amelioration action with respect to image display. Various exemplary amelioration actions are described herein. For example, exemplary amelioration actions include, but are not limited to: sending at least one image from the one or more images to a special repository/ies (e.g., Disturbing Image Repository/ies) for storage therein; darkening the at least one image; making a face or other image feature unrecognizable in the at least one image; and changing a size of the at least one image. The shuttling of images to and from a set of DIRs may take place over time, as the image or user is better assessed. It is to be appreciated that one of ordinary skill in the art will contemplate the disclosed amelioration actions as well as other amelioration actions given the teachings of the present principles provided herein, while maintaining the spirit of the present principles.

The server 210 estimates and/or otherwise determines the cognitive characteristics relating to the set of images and a user. In an embodiment, the cognitive characteristics may be estimated emotional responses to images. In an embodiment, face-monitoring technology can be used to estimate a user's current mood, among other known methods for mood-estimation. Of course, the present principles are not limited to the preceding cognitive characteristic and, thus, other cognitive characteristics can also be used in accordance with the teachings of the present principles, while maintaining the spirit of the present principles.

The server 210 forms the composable templates. The composable templates can be formed and configured to allow control of the templates by a user, guardian, provider, team member, family member, and so forth.

In an embodiment, one or more hierarchical planning systems are used by the server 210 to form the composable templates, e.g., based on the cognitive and contextual characteristics related to the set of images. The hierarchical planning systems encode "policies" with respect to the desired amelioration action in a given context and cognitive state. Over time, new policies/rules may be learned or inferred for the composable templates, e.g., as the user's preferences/feelings towards certain actions change.

The repositories 220 can have an associated estimate of possible distress, D, caused by viewing, and several image albums may be segregated according to D, and to a confidence-level with respect to the assessment of D.

In the embodiment of FIG. 2, the different repositories are segregated according to an estimated distress likelihood. Shuttling between repositories may take place over time, as the image or user is better assessed.

Segregation can be implemented on any basis. For example, in an embodiment, one or more repositories can include multiple albums, where each album corresponds to a different level of segregation that, in turn, corresponds to, e.g., a different level of estimated distress. In an embodiment, each album can be implemented by a separate file or file set. In an embodiment, each album can be implemented by a different storage device. In an embodiment, each album can be implemented by a different storage region within a file, device, and/or so forth. In an embodiment, multiple repositories can be segregated, where each repository corresponds to a different level of segregation that, in turn, corresponds to, e.g., a different level of estimated distress. Segregation can be applied to images and/or sounds. In an embodiment, one or more albums and/or repositories can be implemented in the cloud.

While one or more embodiments of the present principles are directed to visual data in images, the present principles can also be readily applied to sounds (e.g., any sound including, but not limited to, voices, crash/accident sounds, disaster sounds, and so forth), e.g., in a video formed from a set of images. That is, according to an embodiment of the present principles, sounds and voices may also be shielded and shuttled to the repositories. Hence, in an embodiment, the repositories can be image and sound repositories that store images, photographs, videos, and sounds. Accordingly, the repositories 220 can be interchangeably referred to herein as disturbing image and sound repositories, depending on the implementation. The images and/or sounds may apply to disaster scenarios, where crews working on recovery may need old images to understand the city infrastructure and layout, and the victims may not wish to be reminded about how their house looked after the disaster or how their loved ones died. The present principles provide a way to evaluate and "modulate" the impact of images being shown to users and/or sounds being heard by the users.

In an embodiment, the system 200 can be applied to one or more commercial uses. For example, in an embodiment, the images may relate to Google® Photos, which has a useful feature in which it shows a user photos from the same day but from years ago. However, some of the events from the past years and their respective photos can involve painful memories and should be better avoided, or at least the system can estimate and consider a user's current mood, state of events, or mindset, when a possible viewing is about to occur.

As another example, the application Timehop® helps a user celebrate and/or otherwise view moments from their past, and can bring together a user's old photos and posts from their Phone, as well as from Facebook®, Instagram®, Twitter®, and Foursquare®.

In an embodiment, the composable templates can involve the presentation of warning messages. In an embodiment, the warning messages can be specified by any of a family member, team member, guardian, user, provider, social network, and so forth.

In an embodiment, the server 210 can determine and employ a confidence threshold (or level), according to which the server 210 may automatically determine a course of action.

In an embodiment, templates may be supplied, suggested, used, or learned for various cohorts of users (including a person's demographics, autism spectrum, child vs adult, and so forth).

In an embodiment, a repository 220 may require access by a third party (e.g., a parent of a child, caregiver, family member, team member, and so forth). This may be useful when a child may be exposed to inappropriate images.

In an embodiment, the server 210 can reassess users through time, and this reassessment may change the estimated sensitivity of images, and their placement in repositories, and so forth. As an example, consider the case in which a person had cancer two years ago and has apparently recovered. Now, she goes over her albums. If she is healthy, she can see those photos and be proud of the long way she has come, prevailing over terrible odds against her. If however the cancer relapsed, she may rather not be reminded of those bad days when she was sick then. In one example case, the information of her current situation may be retrieved/harvested from her communications with her friends/peers/colleagues/family/etc.

In an embodiment, images can also be tagged with emotional state and/or biometric information. Emotional state information (or mood) may be stored in the metadata of an electronic image. In an embodiment, a user's computing device, such as a cellular telephone, receives an image from a camera as well as biometric information from a sensor. Sensors may be located on the computing device, or alternatively on a user wearable device. Biometric information may be from a user taking a photograph or from a user viewing a photograph. Biometric information may include heart rate, galvanic skin response (GSR), facial expression, and so forth. In an embodiment, the computing device may calculate an emotional state of a user, such as happiness, based on the biometric information. The tagged biometric and/or emotional state information allows for a way to retrieve, sort and organize images. Tagged images may be used in social media connections or broadcasting, such as blogging specific emotional images.

In some cases, an image changing system 211 separate from or implemented by the server 210 can use automatic emotion detection to estimate a degree of distress that may be associated with the image and use this value to change the image to greater or lesser degrees. For example, the image change system may make use of an emotional scale detection unit to analyze frames of an input in order to automatically detect an emotional scale of the input image(s); and an image change unit to change (e.g. blur) a quality of the input image (or portion of the image) based on an image mode selected according to the emotional scale.

In an embodiment, the server 210 can make use of a computer-implemented method for image filtering (including method implemented using laptop, desktop, mobile, and wearable devices). For example, the server 210 could analyze each image to generate a content vector for the image and apply an emotion operator to the content vector. The emotion operator can be based on pictures with desirable and undesirable characteristics, thereby obtaining an emotion index for the image. The server 210 can compare the emotion index for the image to an emotion i threshold, and take one or more actions or abstaining from one or more actions based on a result of the step of comparing.

In an embodiment, the system 200 can be applied to TV broadcasts, and make use of an emotion rank, generated by ranking engine software that can be displayed on the viewer's display or uploaded to a social networking website on the Internet, or used to shuttle an image to a repository 220. The viewer may also vote in a categorical manner on multiple images. In some cases, the server 210 may make a measurement of the emotional probabilities related to a facial image of either the user or a person in a photo. Then, the server 210 builds a model-based representation from the image, extracts a feature description of the model-based representation, generates a measurable description of the image that includes facial features (based on movements, presence of features, and the visual appearance found in the model), and outputs from these computed facial features predicted classification probabilities for the image.

In an embodiment, one of more elements of system 200 can be implemented in the cloud using cloud technology. For example, in an embodiment, the server 210 and/or one or more of the repositories can be implemented in the cloud.

FIGS. 3-7 show an exemplary system 300 for managing disturbing images and sounds, in accordance with an embodiment of the present principles.

At step 310, provide a set of repositories. In an embodiment, the set of repositories are configured to store disturbing images and can also store disturbing sounds associated with such images (e.g., the sound accompanying a video).

In an embodiment, step 310 can include one or more of steps 310A through 310E.

At step 310A, configure the set of repositories to associate an image stored therein (and sounds associated therewith, if present) with an estimate of possible distress caused by viewing the image (and hearing the sounds).

At step 310B, configure the set of repositories to also associate the estimate of possible distress with a confidence level that is based on the estimate of possible distress.

At step 310C, configure the set of repositories to segregate the storage of images (and sounds) according to the estimate of possible distress.

At step 310D, configure the set of repositories to segregate the storage of images (and sounds) according to the estimate of possible distress and the confidence level based thereon. Segregation can be with respect to different repositories and/or different albums in a given repository. Of course, other segregations can also be used.

At step 310E, configure one or more of the repositories in the set to require access by a third party before a user can access the disturbing image repository.

At step 320, receive a set of images (and sounds associated therewith, if present).

In an embodiment, the images are received from an image service that shows at least one image from a same day as a current day but from an earlier year than a current year (e.g., Google® Photos). Of course, the images and sounds can be received from any source.

At step 330, analyze the set of images (and/or associated sounds, if present) to determine cognitive characteristics relating to the one of more images and a user (and, if sounds are present, other cognitive characteristics relating to the sounds and the user). In an embodiment, the cognitive characteristics include estimated emotional responses to the set of images. In an embodiment, the other cognitive characteristics include estimated emotional responses to the sounds.

At step 340, assign one or more confidence levels to the cognitive characteristics (and, if sounds are present, to the other cognitive characteristics). In an embodiment, step 340 is performed as part of the analysis started at step 330.

In this way, the analysis can determine, on an image or sound basis, whether the images in the set include disturbing images and/or whether the sounds associated with the images include disturbing sounds.

The following steps (350-360) are performed with respect to any disturbing images and/or disturbing sounds detected by the analysis of step 330 along with the confidence values assigned at step 340. That is, images and/or sounds whose cognitive characteristics indicate an undesirable emotional response are further processed by steps 350-360.

At step 350, form a composable template regarding cognitive characteristics related to the set of images and to the user (and, if sounds are present, form another composable template regarding other cognitive characteristics relating to the sounds and to the user).

In an embodiment, step 350 can include one or more of steps 350A through 350I.

At step 350A, form the composable template and/or the other composable template, based on the confidence levels assigned to the cognitive characteristics. That is, the composable template is formed based on the confidence levels assigned to the cognitive characteristics relating to the set of images and to the user.

At step 350B, form the other composable template based on the confidence levels assigned to the other cognitive characteristics. That is, the other composable template is formed based on the confidence levels assigned to the other cognitive characteristics relating to the sounds and to the user.

At step 350C, form the composable template and/or the other composable template using a hierarchical planning system that encodes one or more policies, e.g., with respect to the amelioration action in a given context and a given cognitive state.

At step 350D, form the composable template and/or the other composable template to be controllable by input from at least one of the user, a guardian, a provider, a team member, a family member, and so forth.

At step 350E, form the composable template to specify a methodology for redacting image content (e.g., darkening an image, making a face or other image feature unrecognizable, changing an image size, and so forth).

At step 350F, form the composable template to specify an instruction for initiating any of: (1) a transmission of one or more images to a disturbing image repository for later viewing when it is determined that the user feels emotionally stronger than the current time; (2) a transmission of one or more warning messages specified by the user and/or other person, and/or derived from a social network; and/or (3) an insertion of a pointer in place of the at least one image that redirects the user to a special repository only from which the at least one image is viewable by the user.

At step 350G, form the other composable template to specify a methodology for redacting sound content (e.g., muting a sound, masking a sound, lowering a sound, replacing a sound with another sound, and so forth).

At step 350H, form the other composable template to specify an instruction for initiating any of: (1) a transmission of one or more sounds to a repository for later viewing when it is determined that the user feels emotionally stronger than the current time; (2) a transmission of one or more warning messages specified by the user and/or other person, and/or derived from a social network; and/or (3) an insertion of a pointer in place of the at least one sound that redirects the user to a special repository only from which the at least one sound is hearable by the user.

At step 350I, selectively supply, suggest, use, or learn the composable template and/or the other composable template for various cohorts of the user While only one composable template each is described for a set of images and accompanying sound, more than one of each template can be used, as readily appreciated by one of ordinary skill in the art.

At step 360, perform an amelioration action with respect to a displaying of at least one image on a display device, based on the composable template (and, if sounds are present, perform an amelioration action with respect to a reproducing of the sounds by a reproduction device, based on the other composable template).

In an embodiment, step 360 can include one or more of steps 360A through 360D.

At step 360A, perform an amelioration action for an image can that includes one or more of the following: sending at least one image to a special repository (e.g., a disturbing image repository and/or a disturbing image and sound repository) for storage therein; redacting image content; sending a warning message (e.g., specified by the user and/or other person, and/or derived from a social network); and inserting a pointer, in place of at least one image, that redirects the user to a special repository only from which the at least one image is viewable by the user.

At step 360B, perform an amelioration action for a sound that includes one or more of the following: muting a sound; masking a sound; lowering a sound; replacing a sound with another sound; and so forth.

At step 360C, selectively send the at least one image (and/or at least one sound) to a particular repository in the set based on the estimate of possible distress associated with viewing the image (or hearing the at least one sound).

At step 360D, selectively send the at least one image (and/or at least one sound) to a particular repository in the set also based on the confidence level that is based on the estimate.

At step 370, determine whether to reassess the set of images. If so, then return to step 330. Otherwise, terminate the method. In an embodiment, the timing of the determination can be based on predefined reassessment criteria including, but not limited to, time elapsed since prior rating, level of prior rating, and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
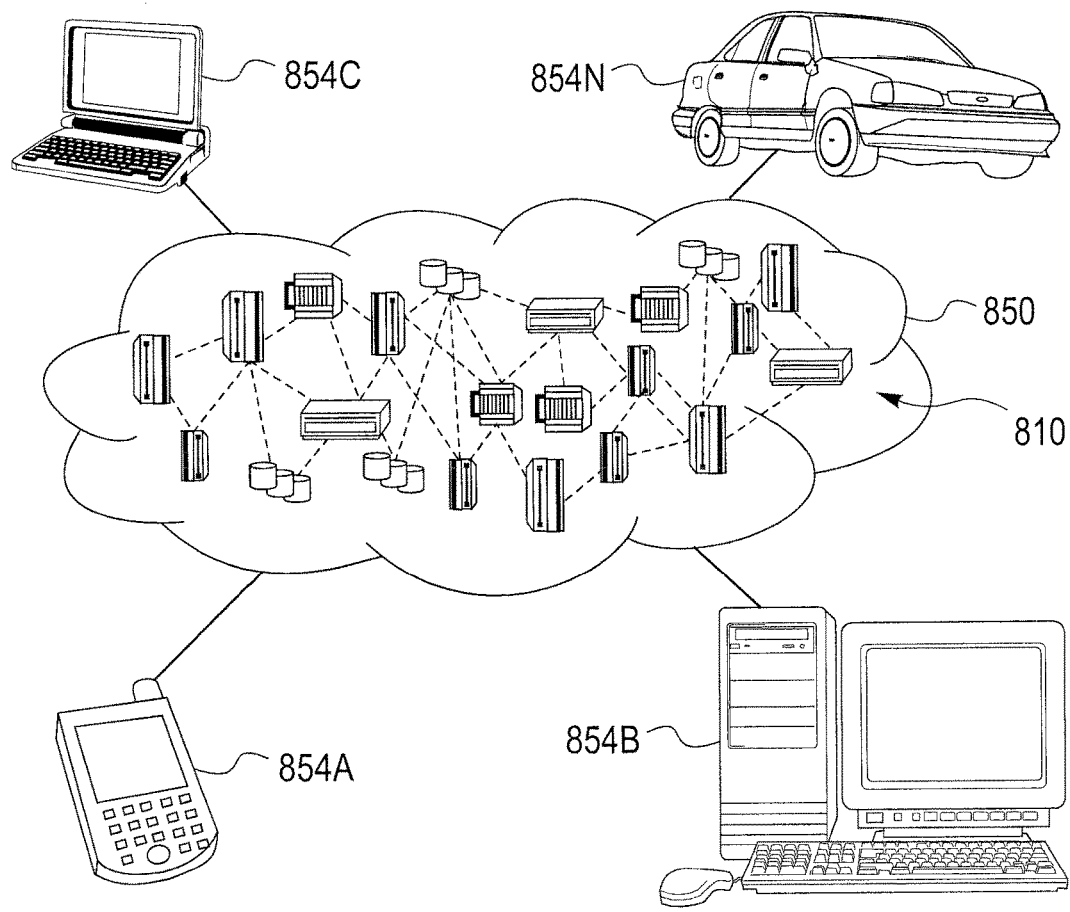
FIG. 8 shows an exemplary cloud computing environment, in accordance with an embodiment of the present principles.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
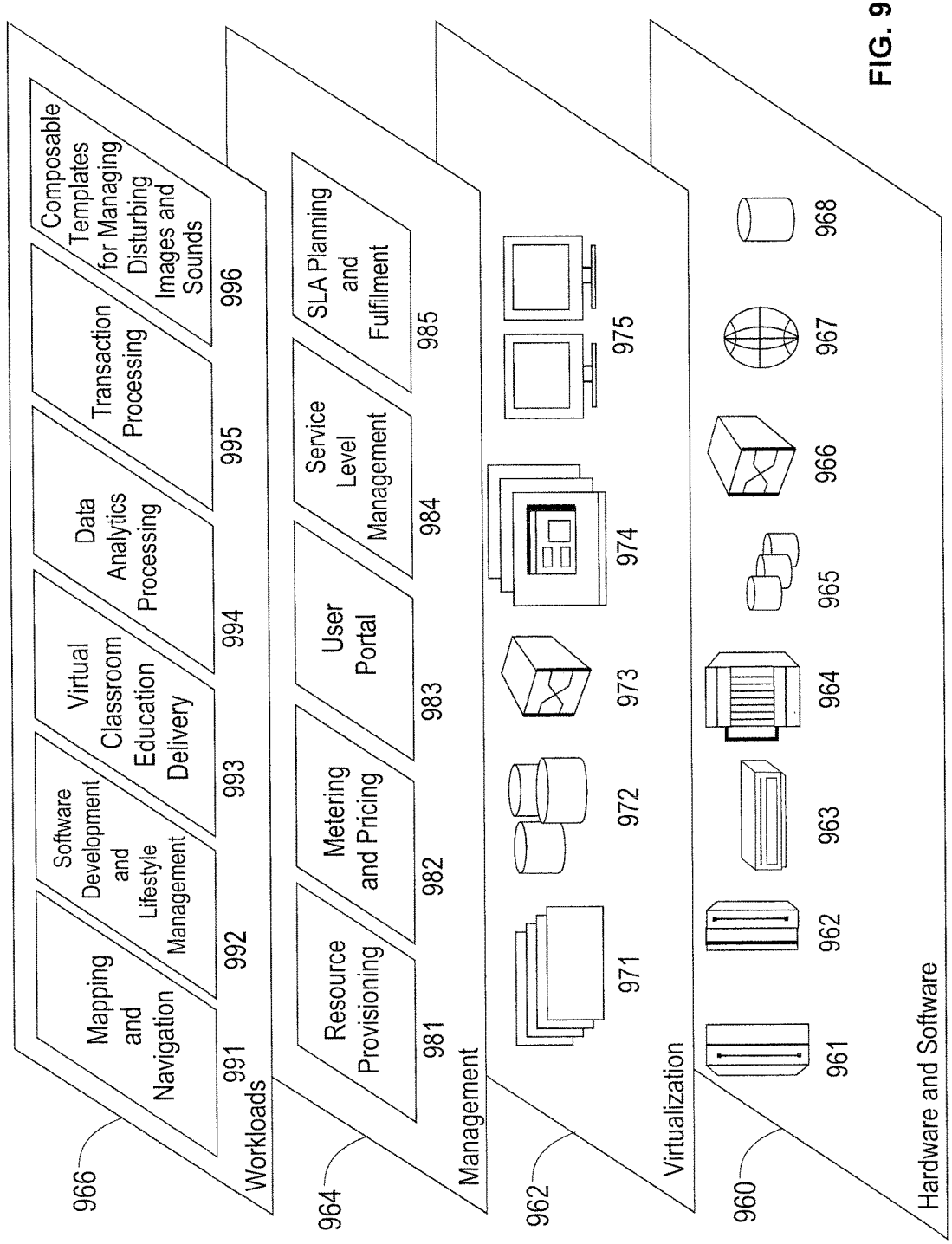
FIG. 9 shows an exemplary set of functional abstraction layers provided by the cloud computing environment shown in FIG. 8, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and composable templates for disturbing image and sound repositories 996.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    analyzing, by a hardware processor, one or more images to determine cognitive characteristics related to the one or more images and to a user;
    forming, by the hardware processor, a composable template relating to the cognitive characteristics;
    updating the composable template by learning one or more policies for desired amelioration actions based on a preference of the user;
    performing, by the hardware processor or another hardware processor, an amelioration action with respect to a displaying on a display device of at least one image from the one or more images, based on the composable template,
        wherein the amelioration action is selected from a set of different types of amelioration actions, the set of different types of amelioration actions including transmitting the at least one image to a disturbing image repository, darkening a portion of the at least one image, blurring a portion of the at least one image, and changing a size of the at least one image; and reassessing the one or more images over time based on a predefined reassessment criteria, the reassessment criteria being a change in an estimated sensitivity of the at least one image.

2. The method of claim 1, wherein the cognitive characteristics comprise estimated emotional responses to the one or more images.

3. The method of claim 1, further comprising assigning one or more confidence levels to the cognitive characteristics, wherein said forming step is further based on at least one of the one or more confidence levels.

4. The method of claim 1, wherein the composable templates are formed using a hierarchical planning system that encodes the one or more policies with respect to the amelioration action in a given context and a given cognitive state.

5. The method of claim 1, wherein the learning one or more policies further comprises forming other composable templates based on a response of the user to various different amelioration actions.

6. The method of claim 1, wherein the composable template specifies a methodology for redacting image content, and the amelioration action comprises redacting the image content from the at least one image.

7. The method of claim 1 wherein the composable template specifies an instruction for initiating a transmission of the at least one image to the disturbing image repository for later viewing when it is determined that the user feels emotionally stronger than the current time, and the amelioration action comprises transmitting the at least one image to the disturbing image repository.

8. The method of claim 1, wherein the composable template specifies an instruction for initiating a transmission of one or more forewarning messages to a potential viewer, and the amelioration action includes transmitting the one or more forewarning messages to the potential viewer.

9. The method of claim 1, wherein the composable template specifies an instruction for initiating an insertion of a pointer in place of the at least one image that redirects the user to a special repository only from which the at least one image is viewable by the user, and wherein the amelioration action comprises inserting the pointer in the at least one image.

10. The method of claim 1, wherein the composable template is controllable by one or more inputs from at least one of the user, a guardian, a provider, a team member, and a family member.

11. The method of claim 1, wherein one or more composable templates are selectively supplied, suggested, used, or learned for various cohorts of the user.

12. The method of claim 1, wherein the amelioration action comprises at least one of darkening the at least one image, making a face or other image feature unrecognizable in the at least one image, and changing a size of the at least one image.

13. The method of claim 1, further comprising configuring the disturbing image repository to require access by a third party before the user can access the disturbing image repository, and wherein the amelioration action comprises transmitting the at least one image to the disturbing image repository for storage therein.

14. The method of claim 1, further comprising:
segregating respective image albums from a plurality of image albums stored in a disturbing image repository and corresponding to the user, according to possible image viewing induced distress;
determining an estimate of possible image viewing induced distress for the at least one image; and
selectively placing the at least one image into a respective one of the plurality of image albums, based on the estimate.

15. The method of claim 14, wherein the plurality of albums are further segregated according to confidence values for the possible image viewing induced distress, and wherein said selectively placing step is further based on a confidence value for the estimate for the at least one image.

16. The method of claim 14, further comprising:
segregating a plurality of disturbing image repositories, according to possible image viewing induced distress;
determining an estimate of possible image viewing induced distress for the at least one image; and
selectively placing the at least one image into a respective one of the plurality of disturbing image repositories, based on the estimate.

17. The method of claim 1, wherein the set of images are comprised in a video with sound, and wherein said analyzing, forming, and performing steps are also applied to the sound, to determine other cognitive characteristics relating to the sound and to the user, to form another composable template relating to the other cognitive characteristics, and to perform a different amelioration action with respect to a reproducing of the sound to the user on a speech reproduction device, based on the other composable template.

18. The method of claim 1, wherein at least one of the one or more images shows a disaster scenario.

19. A non-transitory computer readable storage medium comprising a computer readable program for managing disturbing images, wherein the computer readable program when executed on a computer causes the computer to perform the steps of:
analyzing, by a hardware processor, one or more images to determine cognitive characteristics related to the one or more images and to a user;
forming, by the hardware processor, a composable template relating to the cognitive characteristics;
updating the composable template by learning one or more policies for desired amelioration actions based on a preference of the user;
performing, by the hardware processor or another hardware processor, an amelioration action with respect to a displaying on a display device of at least one image from the one or more images, based on the composable template,
wherein the amelioration action is selected from a set of different types of amelioration actions, the set of different types of amelioration actions including transmitting the at least one image to a disturbing image repository, darkening a portion of the at least one image, blurring a portion of the at least one image, and changing a size of the at least one image; and
reassessing the one or more images over time based on a predefined reassessment criteria.

20. A system, comprising:
a memory operatively coupled to one or more hardware processors, the hardware processors being configured to:
analyze one or more images to determine cognitive characteristics related to the one or more images and to a user;

form a composable template relating to cognitive characteristics;
update the composable template by learning one or more policies for desired amelioration actions based on a preference of the user;
perform an amelioration action with respect to a displaying on a display device of at least one image from the one or more images, based on the composable template,
   wherein the amelioration action is selected from a set of different types of amelioration actions, the set of different types of amelioration actions including transmitting the at least one image to a disturbing image repository, darkening a portion of the at least one image, blurring a portion of the at least one image, and changing a size of the at least one image; and
reassess the one or more images over time based on a predefined reassessment criteria, the reassessment criteria being a change in an estimated sensitivity of the at least one image.

* * * * *